United States Patent Office 3,558,456
Patented Jan. 26, 1971

3,558,456
PREPARATION OF NITRONIUM PERCHLORATE
Julian Lakritz, Rahway, and John R. Lovett, Edison, N.J., assignors to Esso Research and Engineering Company, a corporation of Delaware
No Drawing. Filed Feb. 2, 1960, Ser. No. 6,319
Int. Cl. B01j 1/10; C01b 7/02
U.S. Cl. 204—157.1
3 Claims The present invention relates to an improved method for preparing nitronium perchlorate or, as it is sometimes called, nitroxyl perchlorate. In one aspect, the invention concerns the use of certain oxides of nitrogen in the preparation of the aforementioned perchlorate. In another aspect, it relates to the use of chlorine to prepare chlorine oxides which are also used in the manufacture of nitronium perchlorate.

Heretofore, nitronium perchlorate has been prepared by reacting perchloric acid with nitrogen pentoxide or nitryl chloride, generally in nitromethane. The product obtained in the methods employing perchloric acid is very shock sensitive and therefore has little or no commercial value as an oxidizing or nitrating agent. It is thought that the reason for the high instability of the product is the presence of unreacted perchloric acid. This substance is quite hazardous by itself and when mixed with nitronium perchlorate it makes the latter explosive.

Nitronium perchlorate can be prepared so that it is relatively shock insensitive. This may be accomplished by reacting ozonized air with chlorine dioxide in the gas phase and recovering solid nitronium perchlorate as a product. This reaction is generally carried out at substantially room temperature and atmospheric pressure. While it was found that this method of preparing nitronium perchlorate results in a substance which is easy to handle and work with, the yield of nitronium perchlorate is quite low.

It has now been discovered that the employment of inorganic oxides of nitrogen, especially nitrogen dioxide and its dimer nitrogen tetroxide, in the gas phase preparation of nitronium perchlorate results in the recovery of more than twice the yield of nitronium perchlorate obtained by conventional gas phase methods. The nitrogen oxides may be used either alone or in admixture with ozonized air or oxygen. Ozonized oxygen is preferred when nitrogen oxides are added to the reaction zone because the efficiency of converting pure oxygen to ozone is greater than converting the oxygen in the air to ozone. If no nitrogen oxide is used, ozonized air must be used to provide nitrogen to the system.

In carrying out the present invention, chlorine oxide is reacted with nitrogen oxide and usually ozone in the gaseous phase at temperatures of −20° C. to 50° C., preferably 10 to 35° C., and under pressures of 0 to 100 p.s.i.g. Where the reactants are nitrogen pentoxide and chlorine trioxide, ozone is not necessary. However, if lower oxides are used, e.g., nitrogen tetroxide, ozone must be used. The nitrogen oxide, chlorine oxide and ozone, when used, are introduced into a reaction zone in proportions which favor the highest yield of perchlorate. The reaction zone should have facilities for permitting the removal of solid nitronium perchlorate product and the withdrawal of gaseous materials comprising mainly unreacted substances which can be recycled to the reaction zone. The term "chlorine oxide" as used herein means an inorganic chlorine compound containing 2 or 3 oxygen atoms.

In one embodiment of the invention, chlorine dioxide and nitrogen tetroxide are added to a stream of ozone in such amounts that the product is just kept from turning yellow-green by excess chlorine dioxide, and the nitrogen tetroxide level is adjusted to just below the point where nitrogen tetroxide is lost in the effluent gases. In general, about 0.25 to 0.75 mole of nitrogen tetroxide is contacted with about 0.25 to 0.75 mole of chlorine dioxide or chlorine trioxide and 2 moles of ozone for from 0.01 second to several minutes, preferably for about 2 seconds to about a minute. If ozonized air is introduced into the reaction zone, less nitrogen dioxide or its dimer is needed since the ozonized air contains some nitrogen pentoxide which reacts to form the desired product. However, as mentioned above, this reaction is slow and results in low yields of nitronium perchlorate. In the present process, the major proportion of the perchlorate product is derived from nitrogen dioxide, nitrogen tetroxide or nitrogen pentoxide.

In a preferred embodiment, substantially stoichiometric amounts of ozonized oxygen, nitrogen tetroxide and chlorine are passed into an irradiated reaction zone, which is maintained at approximately ambient temperature and atmospheric pressure, and wherein the gaseous reactants combine to form solid nitronium perchlorate. If desired, the chlorine may be passed through an irradiated zone with ozone prior to being introduced in the reaction zone, in which case the reaction zone need not be irradiated. Any suitable irradiating source, such as ultraviolet light or ionizing radiation, e.g. gamma rays, may be used. If gamma radiation is employed the dosage used should be at least $1 \times 10^4$ rads/hour but not more than $1 \times 10^8$ rads/hour. The solid product may be removed by continually shaking the solid to the bottom of the reaction zone and continually withdrawing at least a portion of it from said zone. The unreacted gases may be recycled to the reaction zone. The nitrogen tetroxide feed should be adjusted to just below the level at which the exhaust gases have a brownish color. If this color occurs in the gases leaving the reaction zone it is an indication that an excess of nitrogen tetroxide is present in the reaction zone and its flow rate should be adjusted downward until no more brownish gas is detected.

It is believed that the chlorine and ozone react when properly initiated, for instance by U.V. irradiation, to form chlorine dioxide and/or chlorine trioxide. The chlorine readily reacts with the ozone and thus the exposure time need not exceed 5 or 6 minutes, about ½ to 2 minutes being generally satisfactory, when a 100 watt quartz ultraviolet light source is used. This process is preferred because the raw materials are relatively inexpensive and it avoids the handling of chlorine dioxide which is a dangerous reactant.

The reaction should be carried out under substantially anhydrous conditions. Thus reactants and the reaction zone employed in the preparation of the perchlorate product must be free of water.

The ozone used in the preparation of nitronium perchlorate may be obtained by passing oxygen or air through a suitable ozonizer, such as one operating on 60 cycles and 14,000 volts at 0° C. Where oxygen is used the ozone should be diluted with a gas, such as oxygen or nitrogen, to avoid uncontrolled reactions which lead to explosions. The ozone-containing gas may safely contain up to 100 wt. percent ozone. Of course, there should be a minimum of 0.01% ozone in the gas to insure a rapid reaction.

The nitronium perchlorate obtained in accordance with the invention is a white solid having a density of about 2.2 g./cc., a decomposition temperature of about 120° C. and a shock sensitivity of >90 kg. in. While it is not highly shock sensitive as is nitronium perchlorate prepared by the other methods, it is highly reactive when brought into contact with benzene and other hydrocarbons. It reacts with benzene to make nitrobenzene which can be used to make aniline. If it is used as an oxidizing or nitrating agent, it should be diluted in some suitable manner. Moreover, because it is an excellent oxidizing agent, its insensitivity to shock makes it highly desirable for use in solid rocket propellant systems. For example, it may be compounded according to the following formulation:

| Component: | Weight percent |
|---|---|
| Hydrazine diborane | 29.87 |
| Beryllium | 7.90 |
| Nitronium perchlorate | 47.23 |
| Natural rubber (binder) | 15.0 |

The foregoing propellant has a calculated specific impulse of 302 sec.$^{-1}$.

The following examples serve to illustrate how the present invention may be carried out.

EXAMPLE 1

The chlorine dioxide used in the synthesis was prepared by the dropwise addition of a 10 wt. percent solution of sulfuric acid to an aqueous solution of sodium chlorite, was dried by bubbling it through sulfuric acid and then passing it over three traps containing phosphorous pentoxide. It was continuously introduced into one end of a glass tubular reactor where it contacts ozonized air obtained from a Welsbach ozonizer operating at 60 cycles and 100 volts at 25° C. The flow rate of the ozonized air was approximately 0.03 cu. ft./min., while the flow rate of the chloride dioxide is adjusted so as to just avoid discoloration of the product. In the middle of the tubular reactor, which was about 60 inches long and 1 inch in diameter, is an inlet line for introducing nitrogen tetroxide. The nitrogen tetroxide is passed into the reaction tube and its flow is adjusted so that no brownish color appears in the exhaust gases leaving the exit end of the reactor. The reaction zone is at about 25° C. and under a pressure of 2 inches of concentrated sulfuric acid (density 1.84 gm./cc.) throughout the reaction. At the end of 6 hours it was noted that 1.490 grams of nitronium perchlorate is recovered from the first half of the tubular reactor and that 1.610 grams of the same product is obtained from the second half of the tubular reactor at a point beyond the nitrogen tetroxide inlet. No white solid appears in the tubular reactor for several inches up stream of the notrogen tetroxide inlet. The nitronium perchlorate in the first half of the reactor has an acid equivalent weight of 72.6 and contains 9.84% nitrogen, as determined by the Kjeldahl method. The product recovered from the second part of the reactor has an acid equivalent weight of 72.8.

In a control experiment in which no nitrogen tetroxide is added only 1.490 grams of product is produced. Thus, the use of nitrogen tetroxide causes more than a 100% increase in yield.

EXAMPLE 2

Nitronium perchlorate can also be prepared by using chlorine oxide which is made from chlorine and ozone just prior to reacting it with the nitrogen tetroxide. This avoids handling chlorine dioxide which is unstable and it has the added advantage of making the chlorine oxide from basic raw materials, namely chlorine and ozone.

A stream of oxygen is fed into a Welsbach ozonizer at the rate of 0.03 cu. ft./min. The ozonizer is operated at 60 cycles×100 volts and results in the formation of 3.6 mg. of O$_3$/min. To this mixed oxygen-ozone stream is added dry chlorine at about 8 cc./min. The mixed gases are irradiated in a flow system for about a minute with a 100 watt Hanovia quartz U.V. lamp. To this irradiated gas mixture is added nitrogen tetroxide at such a rate that the reaction flask has a brownish appearance, but so that no nitrogen-tetroxide is lost in the effluent stream. After about 3 hours 260 mg. of a white material is obtained that is analyzed for nitronium perchlorate:

Calculated—acid equivalent weight 72.8; Cl, 24.4 percent. Found—acid equivalent weight 71; Cl, 24.7 percent.

EXAMPLE 3

In order to avoid any loss of chloride trioxide that may be formed during the irradiation step in Example 2 and to remove the hazardous chlorine oxides from the gas phase as soon as they are formed, the entire process can be carried out in the irradiated zone in the following manner: oxygen containing ozone is flowed into a zone irradiated with a 100 watt Hanovia quartz U.V. lamp at the rate of 10 mg. of ozone/min. together with 0.63 cc./min. of chlorine gas and 0.63 cc./min. of nitrogen tetroxide. The feed remains in the irradiated reaction zone, which is at room temperature and atmospheric pressure, for about 1 minute. The solid nitronium perchlorate product is continuously removed from the reaction zone and the unreacted gases are separated from the product and recycled to said zone.

It is not intended to restrict the present invention to the foregoing embodiments, but rather it should only be limited by the appended claims in which it is intended to claim all the novelty inherent in the invention.

What is claimed is:

1. The method for preparing nitronium perchlorate which comprises, forming a gaseous reaction mixture by adding to a gaseous stream of ozonized oxygen an amount of chlorine dioxide gas which is just kept from turning the resulting mixed stream to a yellow green color, said yellow green color being caused by adding an excess of chlorine dioxide, and adding to said stream of ozonize oxygen and chlorine dioxide, a stream of nitrogen tetroxide gas in an amount which makes the resulting mixture have a brownish color as the resulting mixture flows through a reaction zone, but adjusted to just below the point at which the brownish color appears in the resulting gaseous product stream leaving the reaction zone, reacting the ozone with the chlorine dioxide and with the nitrogen tetroxide in said reaction zone at a reaction temperature in the range of 10° to 35° C. under anhydrous reaction conditions in a reaction period of about 2 seconds to about 1 minute to form nitronium perchlorate which is carried as a solid white product by the effluent gas stream from said reaction zone.

2. The process as defined in claim 1 in which the chlorine dioxide is admixed with the ozonized oxygen by supplying a stream of dry chlorine to the stream of ozonized oxygen, and the resulting mixture is irradiated with ultra violet light in a irradiation zone to form an irradiated gas mixture containing the chlorine dioxide and ozone to which the nitrogen tetroxide gas is added.

3. In the process as defined in claim 1, said ozonized oxygen being present in ozonized air.

References Cited

UNITED STATES PATENTS 2,858,188  10/1958  Haller _____ 23—85
2,925,368  2/1960  Sandberg _____ 204—157

OTHER REFERENCES

Gordon et al.: "Canadian Journal of Research," vol. 18B, pp. 358–362 (1940).

CARL D. QUARFORTH, Primary Examiner

F. M. GITTES, Assistant Examiner

U.S. Cl. X.R.

23—85, 203